(12) United States Patent
Davis et al.

(10) Patent No.: US 9,746,886 B2
(45) Date of Patent: Aug. 29, 2017

(54) SOLID STATE STORAGE SYSTEM

(71) Applicant: Seagate Technology LLC, Cupertino, CA (US)

(72) Inventors: David Michael Davis, Portsmouth (GB); Alexander Carl Worrall, Waterlooville (GB); Alan John Westbury, Havant (GB)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 118 days.

(21) Appl. No.: 14/640,986

(22) Filed: Mar. 6, 2015

(65) Prior Publication Data

US 2015/0277512 A1 Oct. 1, 2015

(30) Foreign Application Priority Data

Mar. 7, 2014 (GB) .................................. 1404102.4

(51) Int. Cl.
*H05K 7/20* (2006.01)
*G06F 1/18* (2006.01)

(52) U.S. Cl.
CPC .............. *G06F 1/183* (2013.01); *G06F 1/187* (2013.01)

(58) Field of Classification Search
CPC ...... G06F 3/0683; G06F 3/0688; G06F 1/181; G06F 1/187
See application file for complete search history.

(56) References Cited

U.S. PATENT DOCUMENTS

| | | | | |
|---|---|---|---|---|
| 6,722,895 B1* | 4/2004 | Brodsky | ................ | G06F 1/184 439/67 |
| 7,517,231 B2* | 4/2009 | Hiew | .................. | H05K 9/0067 439/76.1 |
| 8,665,601 B1* | 3/2014 | Mangay-Ayam, Jr. | .. | G11C 5/04 361/728 |
| 2002/0160633 A1* | 10/2002 | Brodsky | ................ | G06F 1/183 439/67 |
| 2006/0061955 A1* | 3/2006 | Imblum | .................. | G06F 1/184 361/679.33 |
| 2008/0266816 A1* | 10/2008 | Ni | ........................ | H05K 5/0269 361/737 |
| 2009/0273896 A1* | 11/2009 | Walker | .................... | G06F 1/187 361/679.33 |

(Continued)

OTHER PUBLICATIONS

Combined Search and Examination Report for application No. GB 1404102.4, dated Jul. 30, 2014, 5 pages.

*Primary Examiner* — Anthony Q Edwards
(74) *Attorney, Agent, or Firm* — Holzer Patel Drennan

(57) ABSTRACT

The invention provides a storage system comprising a solid state storage carrier sized to correspond to a defined storage form factor and to include a support printed circuit board (PCB) having arranged thereon a plurality of solid state storage devices. The storage system can include a storage enclosure including a midplane and at least one slot on an end of the storage enclosure, sized to receive a solid state storage carrier for connection with the midplane in the storage enclosure. The storage system can also include at least one midplane connector located on the midplane, wherein the at least one midplane connector is configured to mate with at least one form factor connector on an end of the solid state storage carrier.

20 Claims, 17 Drawing Sheets

(56) References Cited

U.S. PATENT DOCUMENTS

| | | | |
|---|---|---|---|
| 2010/0049914 A1* | 2/2010 | Goodwin | G06F 3/0626 |
| | | | 711/114 |
| 2010/0296236 A1* | 11/2010 | Schuette | G06F 1/187 |
| | | | 361/679.31 |
| 2012/0081856 A1* | 4/2012 | Hopkins | G06F 1/187 |
| | | | 361/679.33 |
| 2013/0107444 A1* | 5/2013 | Schnell | H05K 7/1498 |
| | | | 361/679.33 |
| 2013/0163175 A1* | 6/2013 | Kim | G06F 1/1658 |
| | | | 361/679.32 |
| 2014/0036435 A1 | 2/2014 | Kim | |
| 2014/0049897 A1* | 2/2014 | Hoss | G06F 1/187 |
| | | | 361/679.31 |
| 2014/0146462 A1* | 5/2014 | Coglitore | G06F 1/187 |
| | | | 361/679.33 |
| 2014/0160661 A1* | 6/2014 | Mangay-Ayam, Jr. | G11C 5/04 |
| | | | 361/679.31 |
| 2014/0204537 A1* | 7/2014 | Rust | H05K 7/02 |
| | | | 361/727 |
| 2014/0240915 A1* | 8/2014 | Phelan | G11B 33/128 |
| | | | 361/679.31 |
| 2015/0243140 A1* | 8/2015 | Barrett | G06F 1/181 |
| | | | 340/815.4 |

\* cited by examiner

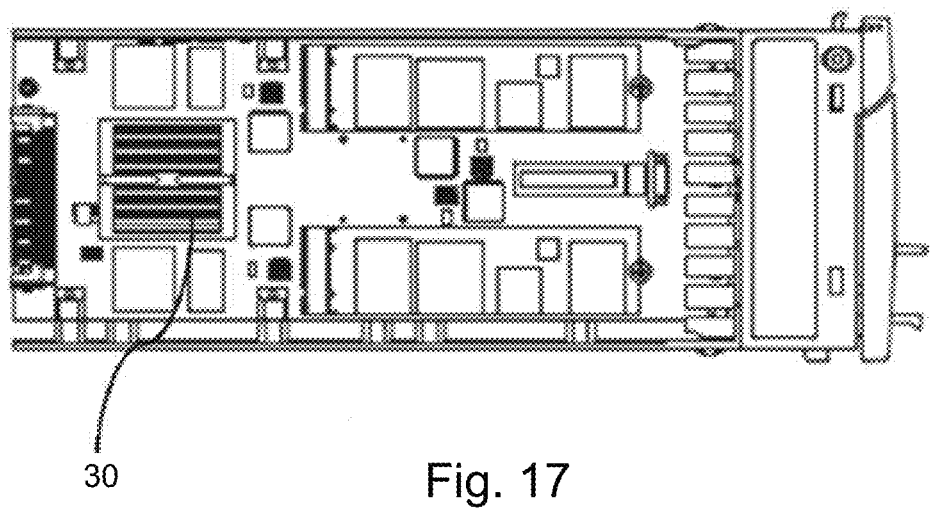
30          Fig. 17

SOLID STATE STORAGE SYSTEM

CROSS-REFERENCE TO RELATED APPLICATIONS

The present application claims benefit of priority to Foreign Application No. GB1404102.4 entitled "A Solid State Storage Carrier and a Storage System" filed on 7 Mar. 2014. This application is specifically incorporated by reference for all it discloses or teaches.

SUMMARY

Implementations disclosed herein provide for a storage system comprising a solid state storage carrier sized to correspond to a defined storage form factor and to include a support printed circuit board (PCB) having arranged thereon a plurality of solid state storage devices. The storage system can include a storage enclosure including a midplane and at least one slot on an end of the storage enclosure, sized to receive a solid state storage carrier for connection with the midplane in the storage enclosure. The storage system can also include at least one midplane connector located on the midplane, wherein the at least one midplane connector is configured to mate with at least one form factor connector on an end of the solid state storage carrier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTION OF THE DRAWINGS

A further understanding of the nature and advantages of the present technology may be realized by reference to the figures, which are described in the remaining portion of the specification.

FIGS. 12 to 17 show various views of possible configurations for a solid state storage carrier.

DETAILED DESCRIPTION

Figure 1A:
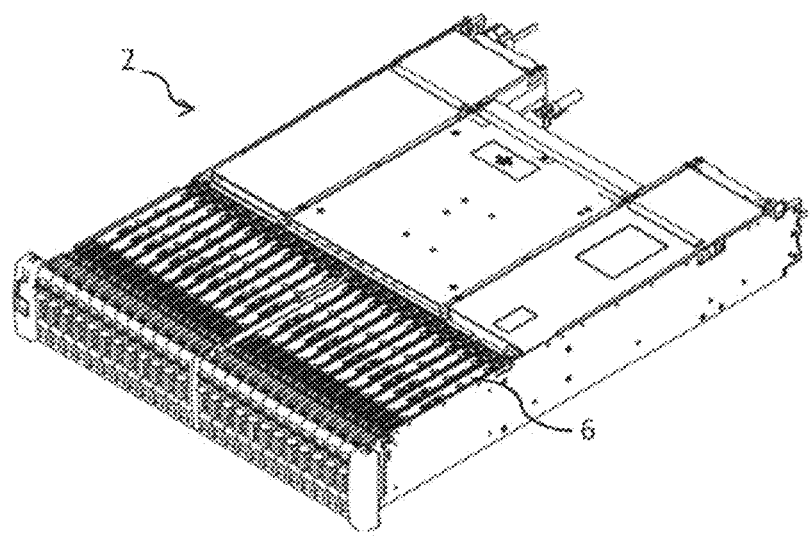
FIG. 1A is a view of a storage enclosure.
Figure 1B:
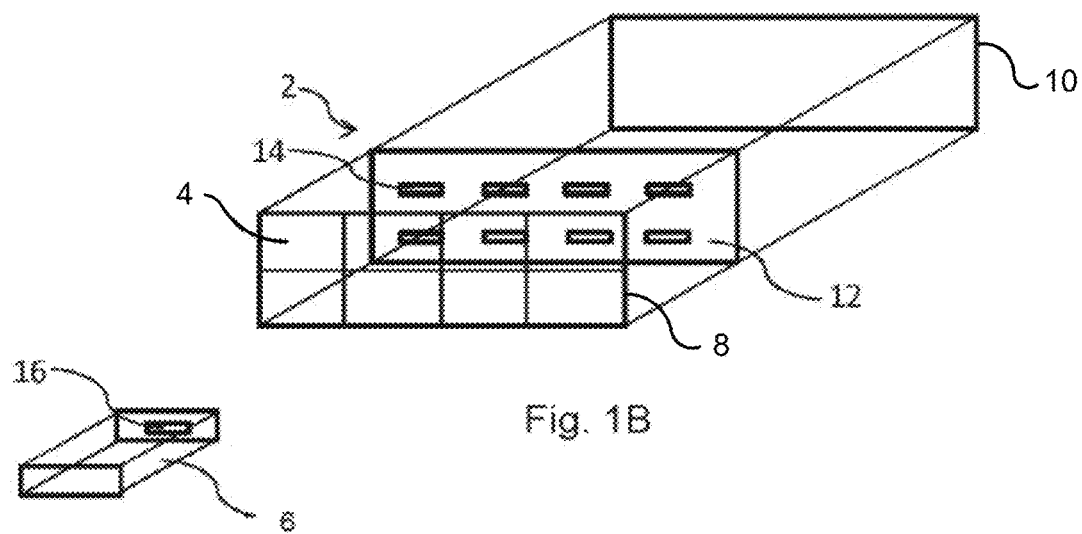
FIG. 1B is a schematic representation of a storage enclosure similar to that of FIG. 1A.

There is an ever present need for increased amounts of data storage capacity. As the world becomes more dependent on data storage both locally and remotely, e.g. in the cloud, the need for storage capacity correspondingly increases. Furthermore the need to provide this in an efficient way while minimizing the need for new storage system infrastructure presents problems. Storage systems can include one or more hard disk drives (HDD), which are of defined form factors. Examples include 2.5 inch HDD and 3.5 inch HDD. FIGS. 1A and 1B show a view of such a storage system.

Referring to FIG. 1A, a storage enclosure 2 of a storage system is provided. The enclosure has various slots (e.g., slots 4) each arranged and sized to receive a HDD within a solid state storage carrier 6. FIG. 1B shows schematically how such a storage enclosure 2 may be configured. In particular, storage enclosure 2 has a front section 8 and a rear section 10 separated by a midplane 12. The storage enclosure 2 may be a Storage Bridge Bay system. The enclosure 2 may be the entirety of the storage system or a plurality of plural enclosures could be provided within a larger rack-type system.

In FIG. 1B, the slots 4 are each sized and configured to receive a carrier 6 including a HDD. Thus, the slots 4 and carrier 6 are sized to correspond to a specific form factor for a HDD. In one embodiment, a particular storage enclosure might be arranged for receiving 3.5 inch disk drives or 2.5 inch disk drives, or a combination of the two. Each storage enclosure is designed for a particular form factor, which will determine the size of the slots 4 and the carriers 6 for use within it.

The midplane 12 may be a printed circuit board (PCB) having various midplane connectors 14 arranged such that when a carrier 6 is inserted into a corresponding slot 4, a midplane connector 14 on the midplane 12 mates with a corresponding form factor connector 16 on the carrier. Thus, connection is provided between the midplane 12 and the HDD within the carrier 6.

Control components such as input/output units and controllers and power supply units are arranged within the back 10 of the enclosure 2 are therefore able to communicate with the HDD within the carrier 6, via the midplane 12. In FIG. 1A, the enclosure 2 has a 1×24 array of slots and is thus able to receive 24 hard disk drives. In the schematic representation shown in FIG. 1B, a 4×2 arrangement is shown such that eight hard disk drives can be arranged within the storage enclosure 2.

There have been developments in the provision of solid state storage devices, such that a number of standardized form factors have been developed defined generally as M.2 form factor storage devices, (known formerly as the Next Generation Form Factor (NGFF)). M.2 modules or storage devices are rectangular, with an edge connector on one side, and a semicircular mounting hole at the center of the opposite edge. The connector itself is specified to endure up to 60 mating cycles. The M.2 specification, published by PCI-SIG, the contents of which and hereby incorporated by reference) allows module widths of 12, 16, 22 and 30 mm, and lengths of 16, 26, 30, 42, 60, 80 and 110 mm.

According to a first aspect of the present invention, there is provided a solid state storage carrier, comprising a housing sized to correspond to a defined storage form factor, and a support PCB having arranged thereon a plurality of solid state storage devices. A solid state storage carrier is provided that enables plural solid state storage devices to be housed within a carrier that is sized so as to be able to fit into a slot within a storage system that might have been designed originally to house a different type of storage medium. The solid state storage carrier is configured such that it may be able to fit into the slots within conventional HDD storage enclosures. In other words, the defined storage form factor may be a HDD form factor such as a 2.5 inch or 3.5 inch HDD form factor. In another embodiment, there can be an existing solid state storage form factor. As a result, significant infrastructure within storage can continue to be utilized even though the storage media themselves have changed.

In one embodiment, the defined HDD form factor is that of a 2.5 inch or 3.5 inch HDD, wherein the housing is sized so as to be the size that would be required to house a HDD of the defined form factor. Many existing storage systems are designed for use with carriers for 2.5 inch or 3.5 inch HDD carriers. Therefore, the solid state storage carrier can be used in many existing storage systems.

In another embodiment, the solid state storage devices are M.2 storage modules and the support PCB is configured to receive a plurality of solid state storage carriers (e.g., M.2 storage modules) on a single layer on only one side of the M.2 storage modules.

In another embodiment, at least three, and preferably four or six, M.2 modules are provided in the single layer. By providing at least three and preferably four or six M.2 modules within a single carrier, significant storage capacity can be achieved.

In another embodiment, the support PCB also has arranged on it an aggregating device. In one embodiment, the aggregating device is a serial attached SCSI (SAS) expander.

In another embodiment, the carrier has an electromagnetic interference (EMI) shield at one end of the solid state storage carrier and in which the support PCB extends into the area of the solid state storage carrier surrounded by the EMI shield.

In another embodiment, the support PCB has arranged at one surface a midplane connector for connection to a midplane. In one embodiment, the midplane connector is a SAS connector, a SATA connector, or a PCIe connector. In another embodiment, two surfaces of the support PCB are configured to receive solid state storage devices. In another embodiment, the solid state storage devices have an elongate rectangular form and are arranged so that their longitudinal axis is parallel with the longitudinal axis of the carrier housing.

According to a second aspect of the present invention, a storage system comprises a chassis having slots for receiving storage carriers and one or more solid state storage carriers, each comprising a solid state storage device sized to correspond to a defined HDD form factor and, a support PCB configured to receive the solid state storage devices.

A storage system is provided which from the outside may be sized and appear like an existing HDD storage system. However, the carriers used are solid state storage carriers, including solid state storage devices such as M.2 modules. As a result, storage capacity is increased and the single disk drive in the carrier, which was previously the field replaceable unit, can be replaced by a larger quantity of devices mounted on a solid state storage carrier as a hot pluggable item.

In another embodiment, the storage system has at least one input/output unit and at least one power supply, and a midplane to which the at least one input/output unit and the at least one power supply are coupled, the midplane also having plural connectors each for engagement with one or more of the solid state storage carriers thereby enabling coupling of power and data from and to the one or more of the solid state storage carriers. In another embodiment, the one or more of the solid state storage carriers are solid state storage carriers according to the first aspect of the present invention.

In another embodiment, a solid state storage carrier is provided that enables plural solid state storage devices to be housed within a carrier that is sized so as to be able to fit into a slot within a storage system that might have been designed originally to house a different type of storage medium. For example, the storage enclosures shown in and described above with reference to FIGS. 1A and 1B are designed to receive carriers that are themselves sized so as to hold a single solid state drive SSD or a single hard disk drive of a particular form factor, e.g. 3.5 inch HDDs.

The solid state storage carrier described below is configured such that it would fit into the slots within storage enclosures such as those in FIGS. 1A and 1B, but can hold a plurality of solid state storage devices, e.g. of an M.2 form factor.

Figure 2A:
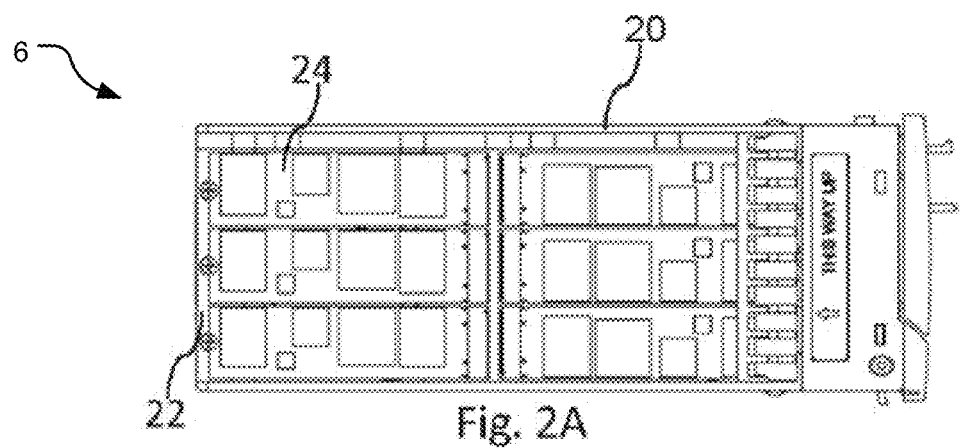
FIGS. 2A to 2C show various views of an example of a solid state storage carrier.

FIG. 2A is a plan view from of a solid state storage carrier 6. The carrier 6 has a housing 20, which corresponds to a defined storage form factor. In this embodiment, it is a HDD form factor but it could be another defined storage form factor such as one for a solid state drive. In other words, the housing 20 is sized so that if it were configured correctly (with the right connectors and control etc.), it could house a single HDD (or other storage medium) of a defined form factor. For example, the housing could be sized so as to house a single 3.5 inch hard disk drive. In the example shown, the housing is sized so as to house a single 2.5 inch drive.

The solid state storage carrier 6 also comprises a support PCB 22 upon which are mounted a plurality of solid state storage devices 24, as shown in FIG. 2A. The solid state storage devices 24 are preferably of a defined form factor such as an M.2 form factor. There are various sizes of solid state storage devices defined within the M.2 specification and any or all of these could be used, as appropriate so as to fit within the housing 20. In FIG. 2A, there are six M.2 solid state storage devices provided which might each be of one specific size. Various memory chips and control components can be provided on each of the solid state storage devices 24.

Figure 2B:
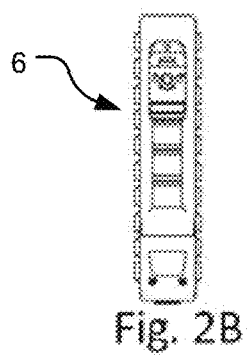
Figure 2C:
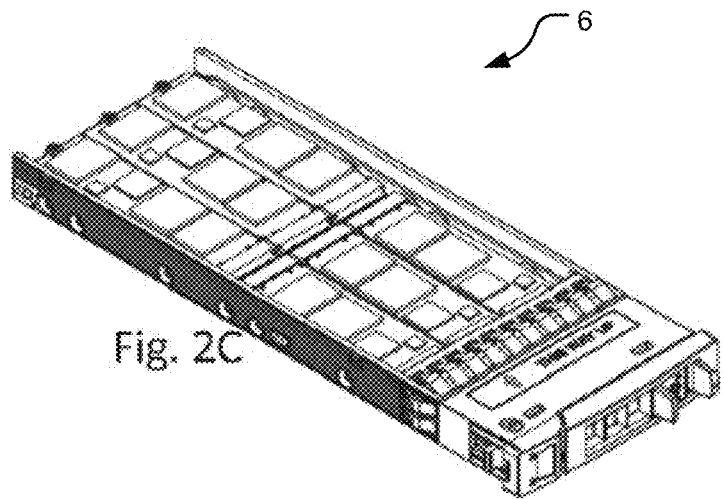

FIGS. 2B and 2C show, respectively, an end view and a perspective view of a solid state storage carrier 6. As shown, the carrier 6 has the dimensions of a conventional HDD carrier. Providing such an arrangement has some significant advantages. Importantly, it means that the hard disk drive carriers that might be used within a conventional storage enclosure (shown and described above with reference to FIGS. 1A and 1B) can now be replaced by solid state storage carriers which can have significantly increased storage capacity. Furthermore, the M.2 storage devices are low power devices, meaning that the heat generated in use will be significantly less (at least on a per unit memory basis) than would be generated by a conventional HDD. Less power and control is therefore needed to provide cooling.

A number of configurations of solid state storage devices can be provided so long as they all enable the M.2 storage devices to fit within the footprint of the carrier 6. As a result, the carrier can be used as if it were merely holding a HDD, within an existing enclosure. Within the enclosure some additional control may be required to enable correct routing of data to a desired solid state storage device within a particular carrier, as described in detail below.

Figure 3A:
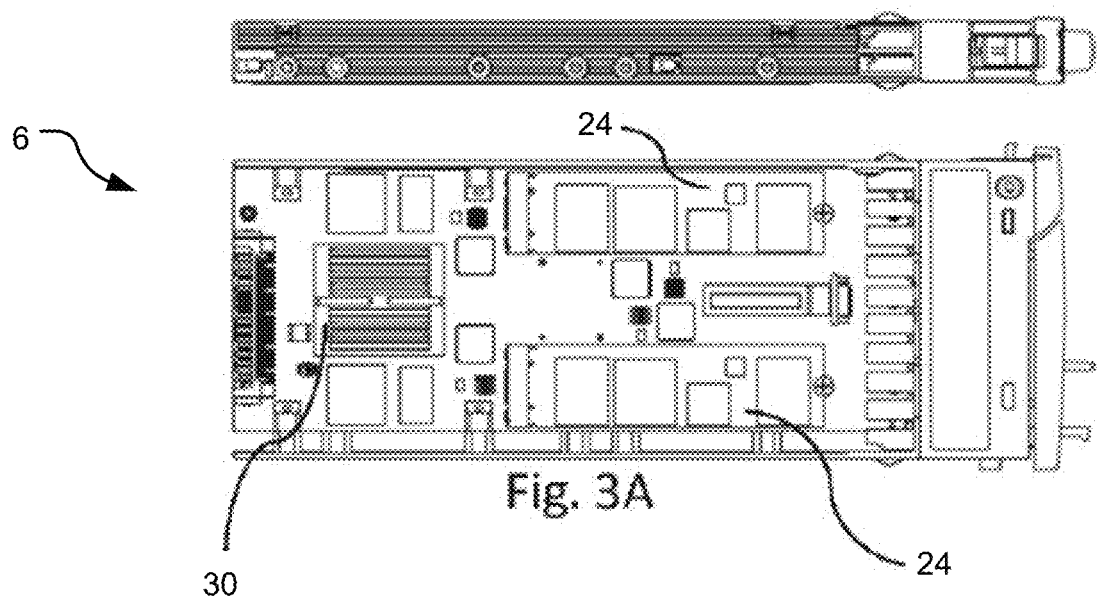
FIGS. 3A and 3B show views from below of the solid state storage carrier of FIGS. 2A to 2C.
Figure 3B:
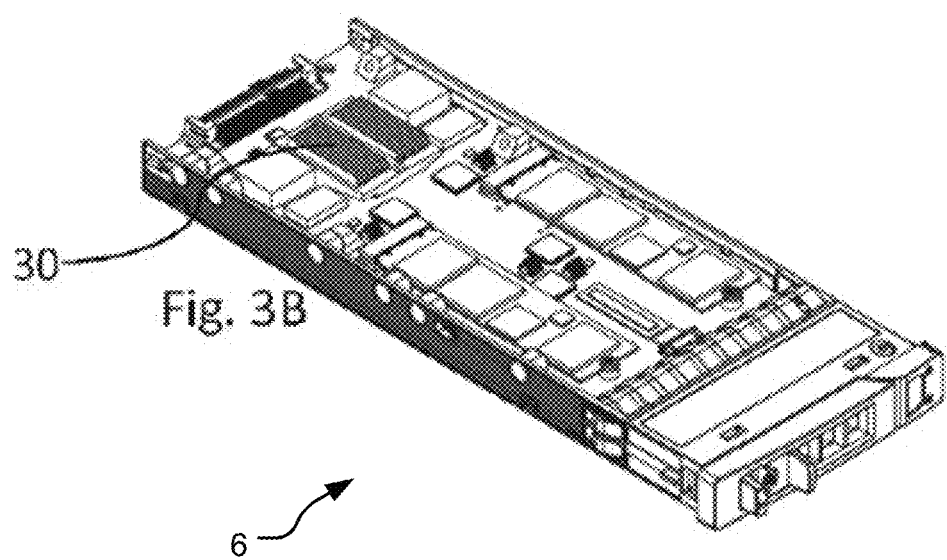

FIGS. 3A and 3B show plan and perspective views of the solid state storage carrier 6 of FIGS. 2A to 2C. In this example, two solid state storage devices 24 are provided on the underside of the support PCB 22 within each of the carriers 6. In addition, some form of aggregating device 30 is provided which provides control within the carrier 6 to enable data to be routed to or from a particular one of the solid state storage devices 24 within the carrier 6.

Figure 4:
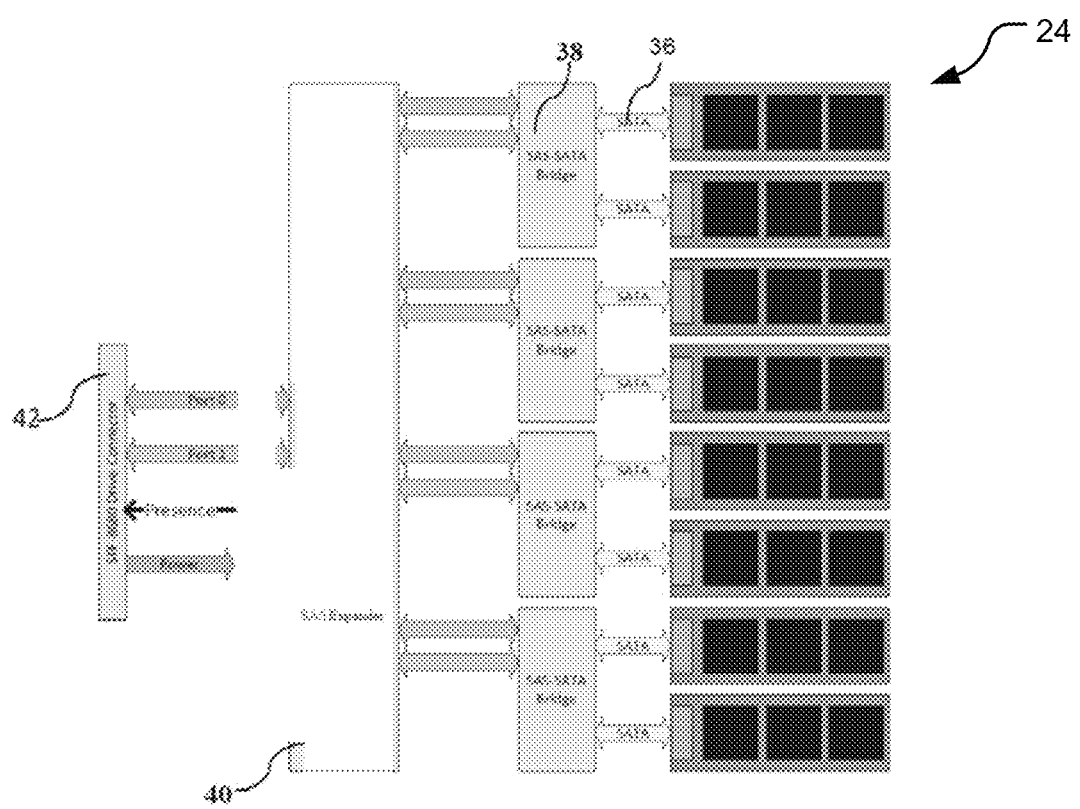
FIG. 4 shows a schematic representation of the connectivity provided within a solid state storage carrier such as those shown in FIGS. 2 and 3.

FIG. 4 shows a schematic representation of a way that the control and connection to the solid state storage carrier may be implemented. As shown, there are a single carrier with eight M.2 solid state storage devices 24. Each solid state storage device 24 has a SATA connection 36 with one of four SAS-SATA bridges 38. These SAS-SATA bridges 38 are connected via respective ports to a SAS expander 40. The SAS expander 40 communicates with a drive connector 42, which, in use, couples to a midplane (not shown) within a storage enclosure. In other words, the drive connector 42 corresponds to the form factor connector 16 shown in FIG. 1B.

Dual independent paths may be provided to solid state storage devices by the single SAS expander 40. This can be achieved by implementation of virtual porting, as described in, for example, commonly owned U.S. Pat. No. 8,402,196, the entire contents of which are hereby incorporated by reference.

In this example, up to eight M.2 solid state storage devices can be provided, each having capacity up to 500 GB, thereby providing within the carrier, storage capacity of approximately 4 TB. This is equivalent to the highest current capacity of a larger form factor 3.5 inch disk drive.

In the example shown, this dense packaging arrangement of solid state storage devices is shown and described with reference to a SAS environment. However, it will be appreciated that it applies more generally and the devices could be any one or more of SAS, SATA, or PCIe or indeed any other solid state storage device. The aggregation device such as the SAS expander 40 could be one or more of a SAS expander, a SATA port multiplier, a PCIe switch, system on chip and a multiple chip solution. A system on chip or similar solution would have the ability to abstract the individual devices, thereby providing data tiering and thereby providing significant flexibility. In some cases, within a single carrier, due to the presence of multiple solid state storage devices 34, a RAID configuration could be provided thereby enabling a high level of security and data redundancy to be provided to data within a single carrier.

It will therefore be appreciated that based on defined form factor devices, such as the M.2 form factor, dense packaging of storage devices can be achieved within carriers which were originally designed for other types of storage enclosures. In particular, the device enables dense packaging of M.2 form factor devices within 3.5 inch and 2.5 inch HDD carriers. By providing such an arrangement, it is possible to use existing HDD storage enclosures with the new M.2 form factor devices thereby negating the need for replacement of the expensive storage infrastructure that is already in existence.

Furthermore, a single disk drive in carrier, which was previously the field replaceable unit (FRU), is replaced. The FRU now becomes the carrier with support PCB and M.2 modules. Individual M.2 modules will be serviceable with the support PCB removed from the carrier, and maybe while still installed in the carrier. There are various sizes of solid state storage devices that are covered within the M.2 specification. It is envisaged that within the present solid state storage carrier, any one or more of type 2280-XX, type 2260-XX and 22110-XX could be used. The precise configuration would depend on application.

Figure 5A:
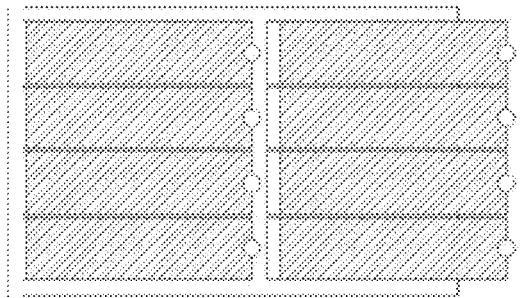
FIG. 5A is a schematic view of a configuration of a solid state storage carrier.
Figure 5B:
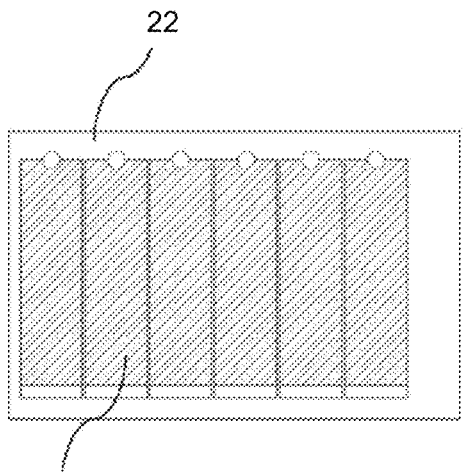
FIG. 5B is a schematic view of a second configuration of a solid state storage carrier.
Figure 6:
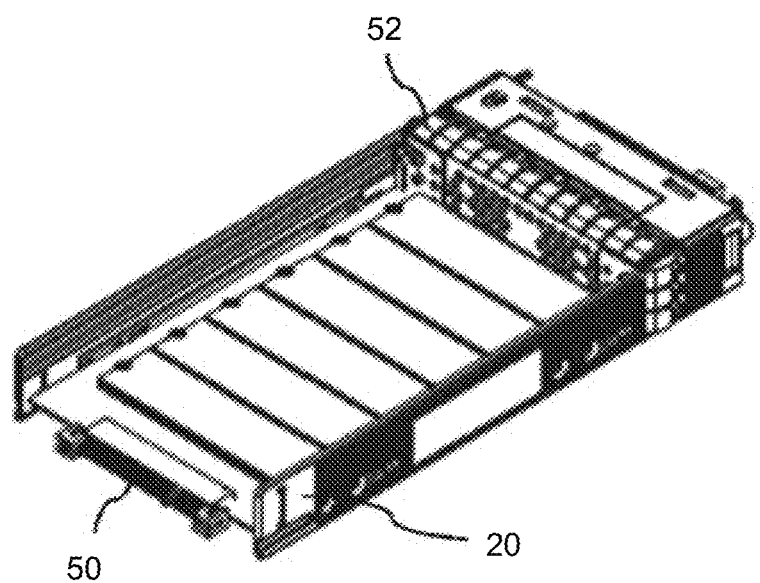
FIGS. 6 to 9 show various views of a solid state storage carrier together with certain parts thereof.
Figure 7:
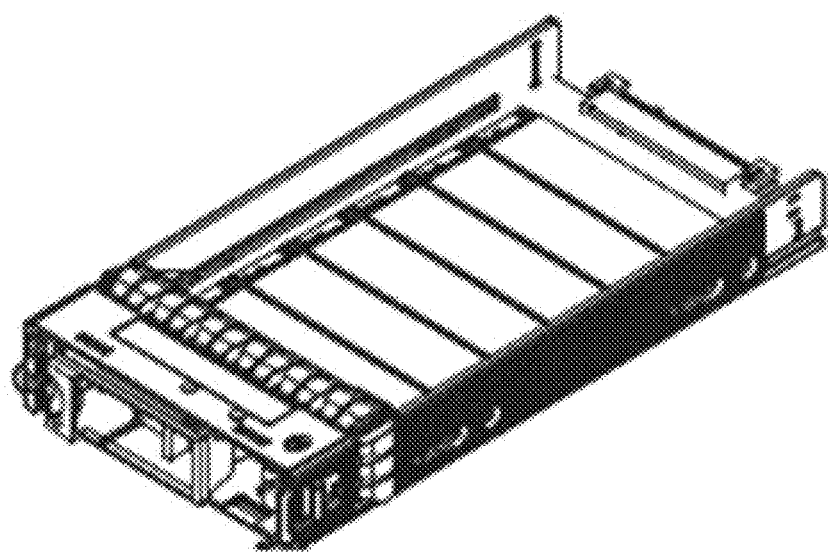
Figure 8:
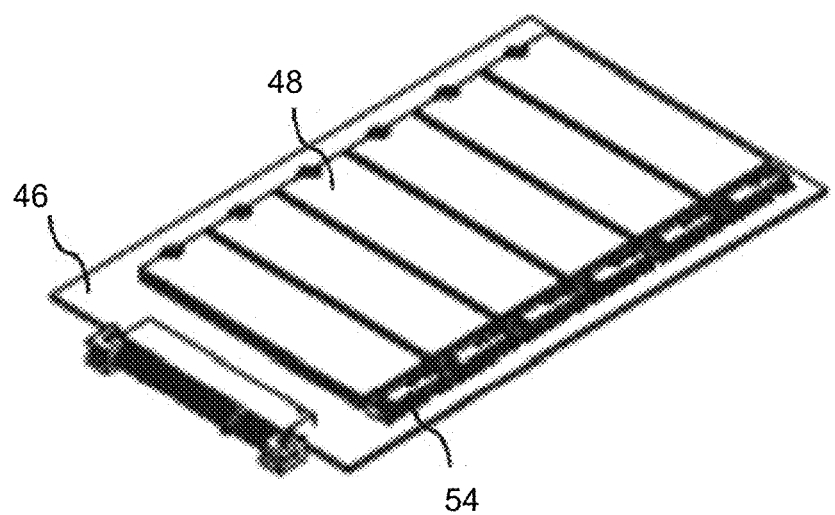

FIG. 5A shows an example of a 3.5 inch disk drive carrier corresponding to the SFF-8301 specification. This allows a nominal plan area of 101.6 mm×147 mm. This increased in certain cases to approximately 101.6×160 mm as it also has provision for the fitting of a transition card, also known as a dongle. As shown in FIG. 5B, this arrangement is therefore suited to a vertical layout, allowing up to six devices within the footprint of the carrier. In other words, the solid state storage devices generally have an elongate rectangular form and are arranged so that their longitudinal axis is transverse with the longitudinal axis of the solid state storage carrier housing.

In FIG. 5B, a support PCB 22 is provided with the solid state storage devices 34 arranged thereon. Solid state storage devices 24 can be provided on both sides (or surfaces) of the support PCB 22 such that in total twelve solid state storage devices may be provided within the carrier. This is in part enabled by the thin nature of the solid state storage devices meaning that within the height of the carrier it is possible to fit in two layers of the solid state storage devices.

In practice, although twelve solid state storage devices can be fitted within the carrier when both sides of the support PCB are used, typically this may be reduced by two or three to allow space on or both sides of the PCB 22 for aggregation hardware such as a SAS expander, PCIE switch or system on chip.

FIGS. 6 to 9 show in more detail, the configuration of the 3.5 inch disk drive carrier as shown schematically above and described with reference to FIGS. 5A and 5B. In this example, the carrier has a housing 20 and is arranged to receive a support PCB 22 having provided thereon a plurality of solid state storage devices 24. A connector 50 is provided on the support PCB 22 to enable the carrier 6 to be engaged with and disengaged from a storage enclosure. In all other respects, from the outside, the carrier appears as a 3.5 inch hard disk drive carrier. Thus, the walls of the carrier are sized so as to be able to house a single 3.5 inch hard disk drive. An EMI shield 52 is provided.

Figure 9:
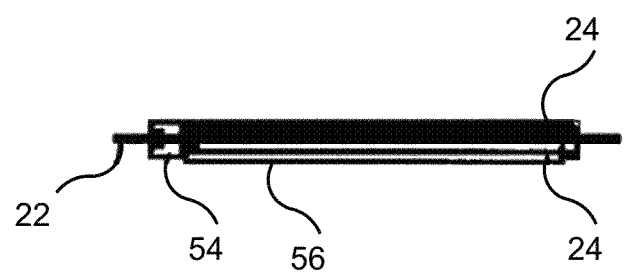

FIG. 9 shows a cross section through the support PCB 22. The solid state storage devices 48 are each coupled to the support PCB via a connector 54. In the example of FIG. 9, solid state storage devices 24 are provided on both sides of the support PCB 22. Various chips and other devices 56 may be provided on the support PCB 22 and/or the solid state storage devices 24 but they are not relevant to the present invention and will not be described in greater detail.

An advantage of the solid state storage devices 24 is that they are low power devices. This means that they do not generate significant heat, in the way that a conventional hard disk drive would have done, and so less cooling per storage device is required. A number of fans or other such devices could be provided to generate an amount of air flow over the devices, but this would be sufficient to keep the devices cool and at a desired operating temperature. It will be appreciated that whilst solid state storage devices are lower power, the overall carrier may not be, due to the density of the M.2 devices and the aggregating device, e.g. bridging silicon. The solid state storage devices have a significant advantage over rotating media due to their superior read/write speed and higher IOs per Second (IOPS).

Figure 10:
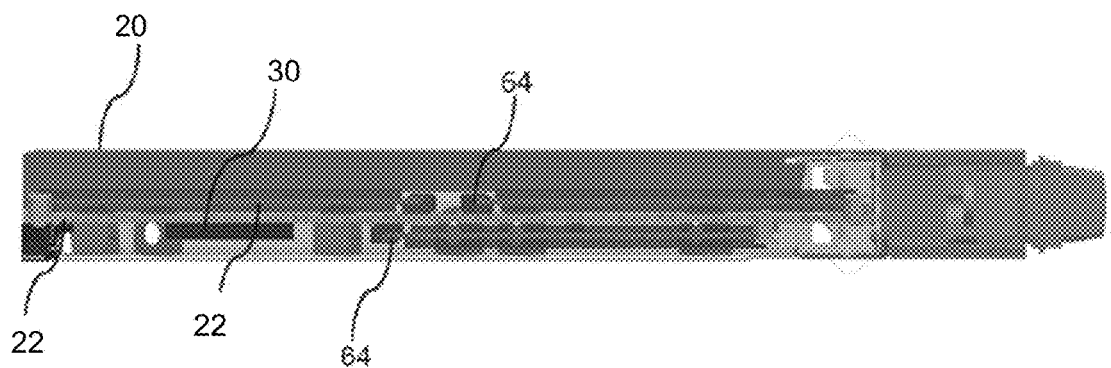
FIG. 10 is a schematic representation of a cross section through a solid state storage carrier.

FIGS. 10 to 17 show alternative examples of a solid state storage carrier. In this case, the housing or original HDD carrier is designed to accept a 2.5 inch disk drive as defined in the SFF-8201 specification. This therefore allows a nominal plan area of 100.45 mm×69.85 mm which, in the example shown in FIG. 10, is increased to approximately 179 mm×69.85 mm so as to provide space for the fitting of a horizontal dongle.

Figure 11:
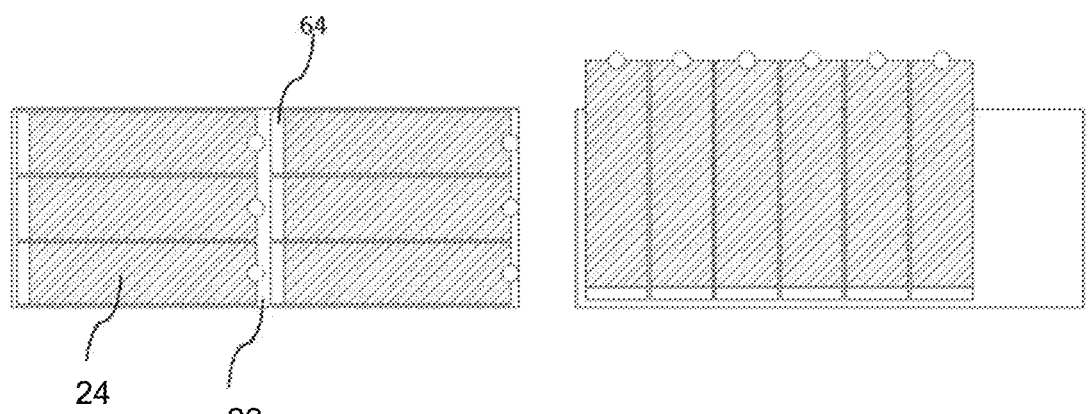
FIG. 11 is a schematic view of a configuration of a solid state storage carrier (showing both a configuration that would be used and one that would not)

FIG. 11 shows a plan view of possible configurations of the 2.5 inch support PCB. As shown, the space is not optimized for a vertical layout (right hand image in FIG. 11), but is suited to a horizontal layout which allows up to six devices on each side of the support PCB. In other words, the solid state storage devices generally have an elongate rectangular form and are arranged so that their longitudinal axis is parallel with the longitudinal axis of the carrier housing. As above, in practice this may be reduced by two or three devices to allow for an aggregation device such as a SAS expander, a PCIe switch or system on chip.

FIG. 10 shows a longitudinal cross section through the carrier. The carrier housing 20 is sized so that, if it were used for housing a HDD, it would fit a single 2.5 inch hard disk drive within it. Instead, as shown in FIGS. 10 and 11 plural solid state storage devices 24 are provided, arranged on a support PCB 22. Referring to FIG. 11, connectors 64 are provided by which the individual solid state storage devices 24 are coupled (e.g. for data and/or power) to the support PCB 22. In the left hand image within FIG. 11, it can be seen, in plan view, that six solid state storage devices 24 are arranged within the footprint of the support PCB 22.

It is possible that within the carrier 6 solid state storage devices 24 are provided only on one side of the support PCB 22. However, it is also possible that solid state storage devices can be provided on both sides of the support PCB 22, as seen in the sectional view of FIG. 10. In this example, the arrangement of the solid state storage devices on the upper surface of the support PCB 22 is as shown in FIG. 11. On the underside of support PCB 22, two or three of the solid state storage devices are removed so as to provide space for a fan out device such as an expander.

Figure 12:
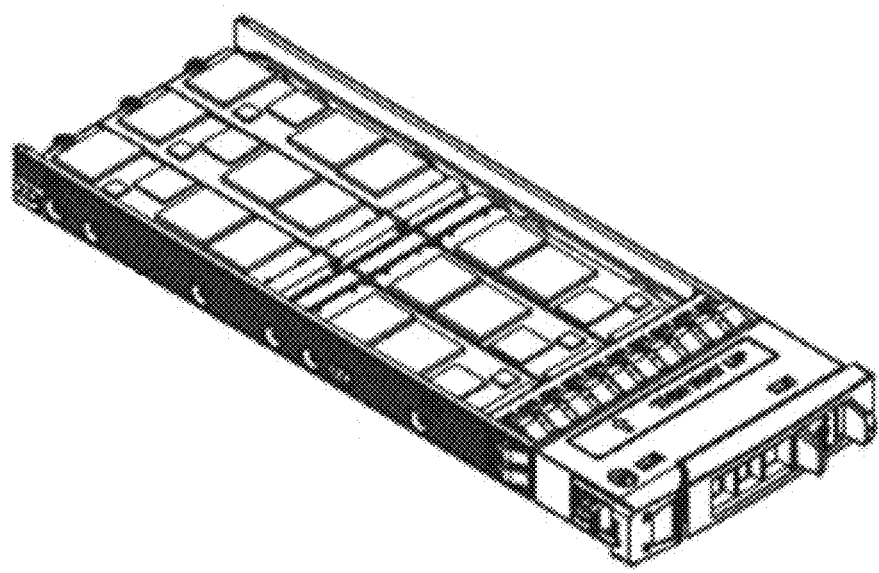
Figure 13:
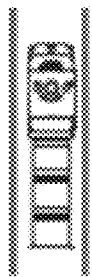
Figure 14:
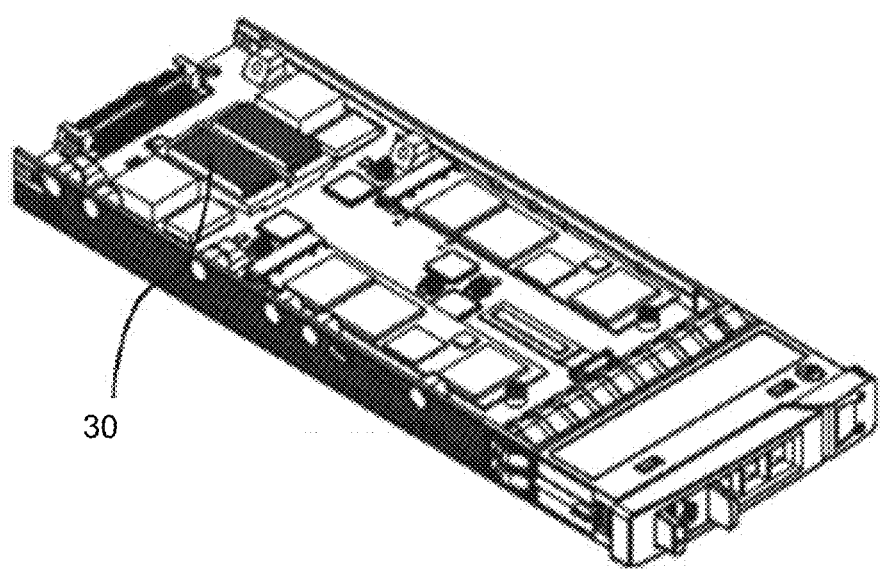
Figure 15:
Figure 16:
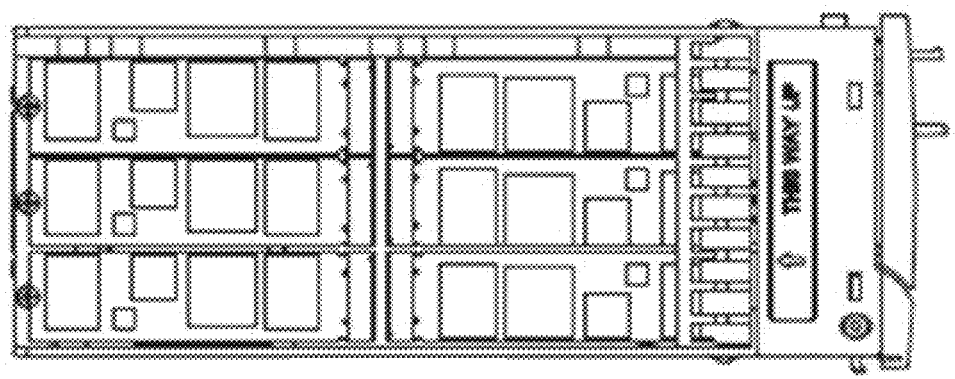

FIGS. 12 to 17 show further views of the carrier of FIG. 10. FIGS. 12 and 16 show, respectively, a perspective view and a plan view from above. FIGS. 14 and 17 show, respectively, a perspective view and a plan view from below. In FIGS. 14 and 17, it can be seen that four of the solid state storage devices have been removed to provide space for the aggregator device 30. The aggregator device here is shown as a solid state switch with a heat sink coupled thereto. Accordingly, as described above (FIGS. 12 and 16) there are six M.2 modules on one side of the support PCB and as seen from below (FIGS. 14 and 17) there are only two M.2 modules. As shown in FIG. 15, the area or volume within the carrier defined by the EMI shield, is usually unused, but in this case the support PCB extends into it, thus increasing the usage ratio of the carrier footprint.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage system, comprising:
a plurality of solid state storage carriers, each of the solid state storage carriers sized to fit in a slot for a hard disk drive carrier in a storage enclosure and to include a support printed circuit board (PCB) having arranged thereon more than one solid state storage devices of a smaller form factor than a hard disk drive form factor; and
the storage enclosure configured to receive the plurality of solid state storage carriers and including a midplane and at least one slot on an end of the storage enclosure, the at least one slot sized to receive a solid state storage carrier for connection with the midplane in the storage enclosure.

2. The storage system of claim 1, further comprising at least one midplane connector located on the midplane, wherein the at least one midplane connector is configured to mate with at least one form factor connector on an end of the solid state storage carrier.

3. The storage system of claim 1, wherein the defined storage form factor of the solid state storage carrier is a hard disk drive form factor of either a 2.5" or 3.5" hard disk drive.

4. The storage system of claim 1, wherein the system comprises a Storage Bridge Bay system.

5. The storage system of claim 1, wherein the solid state storage device is a M.2 storage module.

6. The storage system of claim 1, wherein the support PCB is configured to receive a plurality of solid state storage devices on a single layer.

7. The storage system of claim 6, wherein at least three M.2 modules are provided in the single layer.

8. The storage system of claim 1, further comprising an aggregating device located on the support PCB.

9. The storage system of claim 8, wherein the aggregating device is a serial attached SCSI (SAS) expander.

10. The storage system of claim 1, further comprising an electromagnetic interference (EMI) shield at one end of the solid state storage carrier, wherein the support PCB extends into an area of the solid state storage carrier surrounded by the EMI shield.

11. The storage system of claim 1, further comprising a midplane connector located on one surface of the support PCB for connection to a midplane.

12. The storage system of claim 11, wherein the midplane connector is one or more of a SAS connector, a SATA connector and a PCIe connector.

13. The storage system of claim 1, wherein two surfaces of the support PCB are configured to receive solid state storage devices.

14. The storage system of claim 1, further comprising elongate rectangular solid state storage devices configured so that their longitudinal axis is parallel with the longitudinal axis of the solid state storage carrier.

15. The storage system of claim 1, further comprising at least eight M.2 modules located on more than one surface of the support PCB and an aggregating device located on one surface of the support PCB.

16. The storage system of claim 1, further comprising six M.2 modules located on one surface of the support PCB and at least two M.2 modules located on another surface of the support PCB.

17. A solid state storage system, comprising:
a chassis having slots for receiving a plurality of solid state storage carriers, each of the storage carriers configured in a 2.5 inch or 3.5 inch drive form factor for connection with a midplane in the chassis, each solid state storage carrier including a support printed circuit board and configured to receive at least six solid state storage devices.

18. The solid state storage system according to claim 17, wherein the storage system comprises:
at least one input/output;
at least one power supply; and
the chassis including connectors configured to couple to the at least one input/output and the at least one power supply for data transmission and power supply to at least one solid state storage carrier.

19. The solid state storage system according to claim 17, further comprising at least one midplane connector located on the midplane, wherein the at least one midplane connector is configured to mate with at least one form factor connector on an end of a solid state storage carrier.

20. A solid state storage carrier, comprising:
- a housing configured to receive hard disk drive defined form factors;
- a support printed circuit board having arranged thereon a plurality of solid state storage devices of a smaller form factor size than the hard disk drive the housing is configured to receive; and
- at least one form factor connector configured to mate with at least one midplane connector on a midplane in a solid state storage enclosure.

* * * * *